United States Patent
Wood et al.

[19]

[11] Patent Number: 5,965,877
[45] Date of Patent: Oct. 12, 1999

[54] PHOTOLUMINESCENCE BUILT-IN-TEST FOR OPTICAL SYSTEMS

[75] Inventors: Lance A. Wood, Winter Park; Paul J. Caldwell, Highlands Ranch, both of Colo.; Terrance L. Worchesky, Columbia, Md.

[73] Assignee: Lockheed Martin Corporation, Bethesda, Md.

[21] Appl. No.: 09/039,591

[22] Filed: Mar. 16, 1998

Related U.S. Application Data

[63] Continuation-in-part of application No. 08/739,641, Oct. 30, 1996, Pat. No. 5,729,012, which is a continuation-in-part of application No. 08/428,377, Apr. 25, 1995, Pat. No. 5,572,016.

[51] Int. Cl.[6] ............................... H01J 5/16; G02B 5/14
[52] U.S. Cl. .............................. 250/227.15; 250/227.23; 250/554; 250/226; 356/73.1
[58] Field of Search .............................. 250/226, 227.14, 250/227.15, 227.18, 227.23, 302, 303, 458.1, 461.1, 492.1, 372, 554; 356/44, 73.1

[56] References Cited

U.S. PATENT DOCUMENTS

| | | | |
|---|---|---|---|
| 4,223,226 | 9/1980 | Quick et al. | 356/44 |
| 4,417,140 | 11/1983 | Adolfsson et al. | 250/227.23 |
| 4,644,154 | 2/1987 | Brogardh et al. | |
| 4,791,293 | 12/1988 | Barriere | |
| 4,917,014 | 4/1990 | Loughry et al. | |
| 5,270,537 | 12/1993 | Jacobs | |
| 5,359,192 | 10/1994 | Williams et al. | |

*Primary Examiner*—Stephone Allen
*Attorney, Agent, or Firm*—Dorr, Carson, Sloan & Birney, P.C.

[57] ABSTRACT

A built-in-test capability is provided for determining the integrity of an optical fiber connecting: (a) an optical firing unit having a primary light source emitting a first wavelength, a test light source emitting a second wavelength different from the first wavelength, a mechanism both for coupling light from the light sources to the optical fiber and also for coupling the return light to a detector; and (b) an optically-initiated device which is coupled to a second end of the optical fiber. The apparatus includes a photoluminescent material disposed at a junction of the optically-initiated device and the second end of the optical fiber. In test mode, this photoluminescent material is exposed to the test light source, which results in photoluminescence at a third wavelength. The photoluminescent light travels through the optical fiber to the detector, and when detected indicates optical fiber continuity. The present system can also measure the temperature at the distal end of the optical fiber by detecting changes in the peak wavelength or amplitude associated with the third wavelength as a function of temperature. When the system is used to initiate ordnance, the detector can also detect the initial flash of light produced by the ordnance to provide confirmation that the ordnance has ignited.

21 Claims, 13 Drawing Sheets

PHOTOLUMINESCENCE BUILT-IN-TEST FOR OPTICAL SYSTEMS

RELATED APPLICATION

The present application is a continuation-in-part of the Applicant's co-pending U.S. patent application Ser. No. 08/739,641, filed on Oct. 30, 1996, now U.S. Pat. No. 5,729,012, entitled "Photoluminescence Built-In-Test For Optically Initiated Systems," which is a continuation-in-part of U.S. patent application Ser. No. 08/428,377, filed on Apr. 25, 1995, now U.S. Pat. No. 5,572,016, issued on Nov. 5, 1996.

BACKGROUND OF THE INVENTION

1. Field of the Invention

The present invention relates to fiber optic continuity test systems and, more particularly, to a single-ended tester capable of detecting discontinuities in an optical fiber when operated in a test mode and also providing confirmation of ordnance ignition.

2. Statement of the Problem

Laser initiated ordnance (LIO) systems are well known in the art and typically employ a light pulse which is passed along a fiber optic cable and caused to impinge on an energetic material to heat it to ignition. Laser initiated systems are safer than electrical initiation systems in that the former are not susceptible to inadvertent initiation by static or stray electromagnetic radiation. In addition to avoiding accidental operation, however, ordnance systems are also required to reliably operate upon occurrence of a predetermined stimulus.

Therefore, laser initiated systems present two separate, but related concerns. First, the system should provide a means for checking the continuity of a firing channel to determine whether the channel is misaligned, contaminated, mis-mated, severed, crushed or otherwise nonfunctional. Without a test capability, the only available information relating to nonfunctionality is that, upon sending a "firing" light pulse, the ordnance does not initiate. Second, the system should provide a means for determining whether the ordnance has ignited after a "firing" light pulse has been sent.

The prior art includes many systems that address only the first concern, i.e., checking the continuity of the fiber optic channel. Fiber optic continuity test systems are usually either single ended or dual ended, with singled ended systems being employed in LIO systems because access to only one end of the fiber is possible. Many single-ended testers utilize optical time domain reflectometry (OTDR). OTDR systems work by first transmitting pulses of light into a fiber and then measuring the light that is reflected back using sophisticated high speed detection and timing electronics. The time that it takes for the reflected light to return corresponds to the distance it travels along the fiber. This allows the OTDR system to produce a fiber signature. Two types of reflections occur. Pulse reflections are generated at breaks or joints where the light pulse encounters something other than a continuous glass core. In a typical LIO system, pulse reflections would occur where two sections of fiber-optic cable are connected, and at the interface between the end of the fiber-optic cable and the ordnance. Back scatter reflections are generated uniformly along a fiber as the transmitted pulse travels through the fiber. The back scatter signal provides a measurement of fiber attenuation. OTDR systems are frequently used for finding breaks in communication cables which are typically several kilometers long. One-half meter is considered excellent resolution for an OTDR system. In LIO systems, however, one meter resolution is not acceptable because a break close to the fiber/ordnance interface could not be distinguished from the end of the optical fiber by an OTDR system (e.g., a break only a millimeter from the fiber/ordnance interface would disable the laser ordnance system but would not be detected by an OTDR system). This difficulty is magnified by the fact that the fiber/ordnance interface is a high stress region and is an area where cracks are likely to form.

Where the resolution of a OTDR system is unacceptable, fiber optic continuity systems employing a dichroic mirror have been utilized. U.S. Pat. No. 5,270,537 teaches a continuity test system employing a dichroic filter (at the fiber/ordnance junction) which reflects light within one wavelength range for continuity test purposes and transmits light within a second wavelength range for ignition purposes. A fiber optic conduit having a plurality of connectors contained therein connects the light sources with the ordnance device. The system tests the integrity of the optical fiber by shining a test laser into the fiber-optic cable. A portion of the light reflects as it passes each of the plurality of connectors. Each of these reflections travels to a detector through the fiber-optic cable and is detected. The majority of the test laser light which remains unreflected continues down the fiber-optic cable and is reflected by the dichroic coating. The reflection of the test laser is also sent back up the fiber-optic cable and is detected. The system must be calibrated to distinguish between the reflections that occur at each connector, and the dichroic reflection, i.e., the system must determine the amount of light that must be reflected by the dichroic mirror to ensure there are no breaks in the fiber optic cable. In theory, if there is a break in the fiber-optic cable, the amount of light which transmits through the break, and is subsequently reflected by the dichroic mirror will be at a low level. The detector will detect this low level and determine that there is a break in the fiber-optic cable.

U.S. Pat. No. 5,359,192, entitled "Dual-wavelength Low-power Built-in-test For a Laser-initiated Ordnance System" teaches another continuity test system employing a dichroic filter having a wavelength-dependent reflectivity. A fiber optic conduit having a plurality of connectors connects the light sources with the ordnance device. A dichroic filter is placed at the interface of an ordnance device and the optical fiber. The system tests the integrity of the optical fiber by shining two different wavelengths of test light into the fiber and detecting the light reflected by the dichroic mirror. A relative comparison is made of the light reflected by the wavelength-dependent dichroic mirror at the two different wavelengths. Optical continuity is confirmed if more light will be reflected by the mirror at one of the wavelengths than the other. This scheme was developed to overcome the prior art deficiencies of trying to differentiate the reflections between the conduit connectors and the dichroic mirror reflections because the connector reflections will have a substantially flat optical response within a band encompassing the two wavelengths and therefore do not contribute to the differences in the intensities of the reflected light.

3. Solution to the Problem

Thus, it is desirable to provide a simple and reliable single-ended apparatus for ascertaining fiber optic link continuity from the proximal end of the optical fiber, when operating in a test mode. The present system can also monitor the temperature at the distal end of the optical fiber. In addition, after the primary light source is fired, the detector in the present invention can also detect the initial flash of light from the ordnance to provide positive confirmation that the ordnance has ignited. These features are completely absent from the prior art.

SUMMARY OF THE INVENTION

In accordance with the present invention, an apparatus is provided for testing the integrity of an optical fiber connecting: (a) an optical firing unit having a primary light source emitting a first wavelength, a test light source emitting a second wavelength different from the first wavelength, a mechanism for both coupling light from the light sources to the optical fiber and also for coupling the return light to a detector (with optional filter); and (b) an optically-initiated device (e.g., ordnance) which is coupled to a second end of the optical fiber. The apparatus includes a photoluminescent material disposed at a junction of the second end of the optical fiber and the optically-initiated device. In test mode, this photoluminescent material is exposed to the test light source, which results in photoluminescence at a third wavelength. The photoluminescent light travels through the optical fiber to the detector, and when detected indicates optical fiber continuity. The present system can also measure the temperature at the distal end of the optical fiber by detecting changes in the peak wavelength or amplitude associated with the third wavelength as a function of temperature. When the system is used to initiate ordnance, the detector can also detect the initial flash of light produced by the ordnance to provide confirmation that the ordnance has ignited.

A primary object of the present invention is to provide a novel built-in-test apparatus for determining whether there are breaks in a fiber-optic link in an optical system.

Another object of the present invention is to provide a novel built-in-test apparatus for determining the type of ordnance device to which the fiber optic link is connected.

Another object of the present invention is to provide a means for confirming that the ordnance has initiated.

These and other advantages, features, and objects of the present invention will be more readily understood in view of the following detailed description and the drawings.

BRIEF DESCRIPTION OF THE DRAWINGS

The subject matter which is regarded as the invention is particularly pointed out and distinctly claimed in the concluding portion of the specification. The invention, together with further objects and advantages thereof, may best be understood by reference to the following description taken in connection with the accompanying drawings in which:

DETAILED DESCRIPTION OF THE INVENTION

Figure 1:
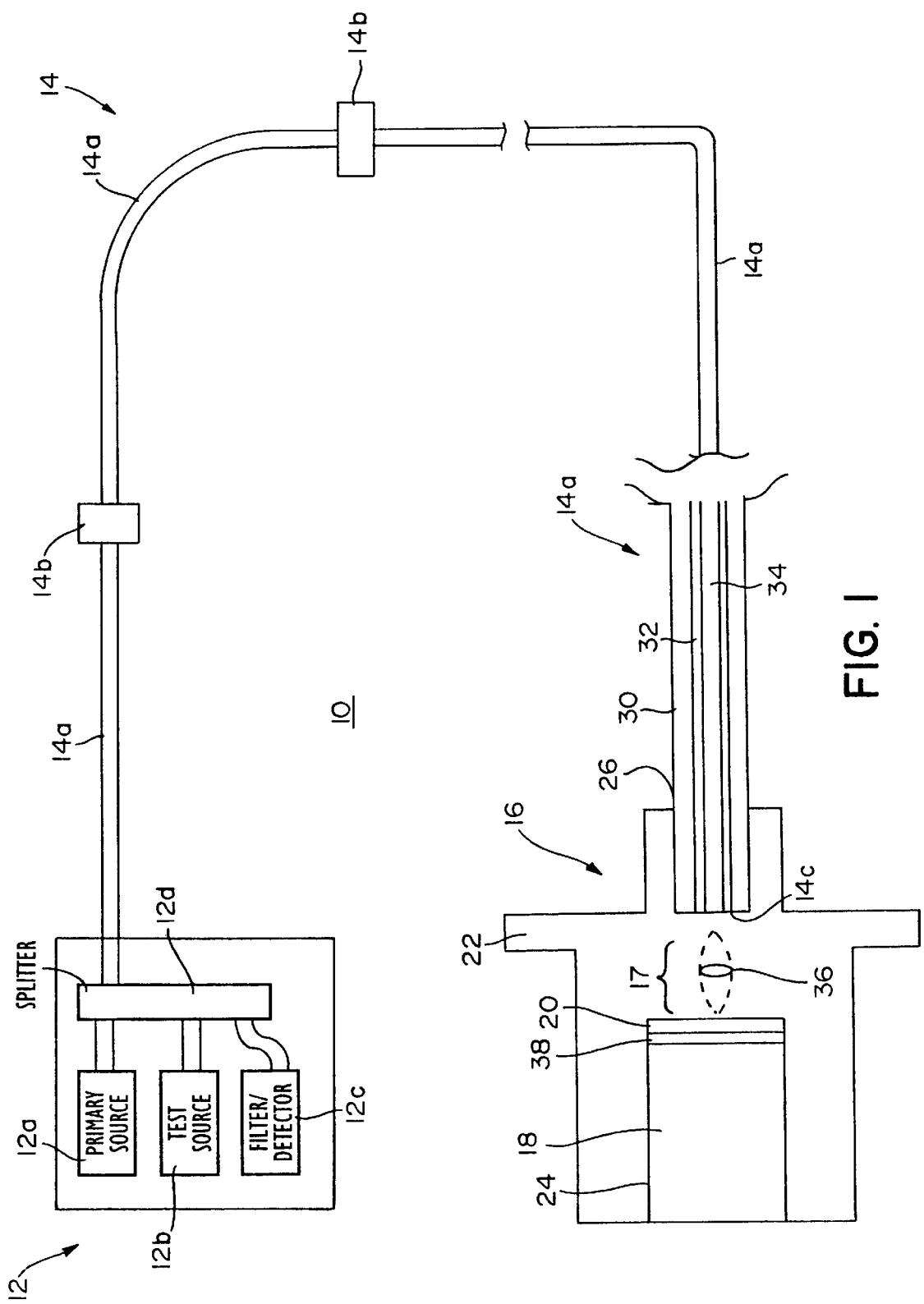
FIG. 1 is a simplified block drawing of a photoluminescence built-in-test structure, in accordance with the present invention.

FIG. 1 shows a photoluminescence built-in-test (PBIT) structure 10 adapted for use in an optically-initiated ordnance system. The test structure 10 includes an optical firing unit 12, a fiber-optic cable assembly 14, and an optically initiated device 16. The optical firing unit 12 has a primary (firing) optical source 12a that emits light at a first wavelength of light. The primary optical source 12a is preferably a laser that may have an output wavelength and energy covering a broad range, with the only limitation being that the output energy have sufficient energy to initiate the energetic material 18 within optically-initiated device 16. Preferably, the primary optical source 12a is a laser that emits light at a wavelength of 850 nm or 980 nm, for example, and has a power of about 0.1 watts to several watts. Also housed in optical firing unit 12 is a secondary (testing) optical source 12b that emits light at a second wavelength of light, and a detector 12c. The secondary optical source 12b is preferably a laser that may have an output energy and wavelength covering a broad range, with the only limitation being that the output energy does not have sufficient energy to initiate the energetic material 18 within the optically-initiated device 16. However, the secondary optical source 12b must deliver sufficient energy to cause photoluminescense of the photoluminescent material layer 20 at the distal end 14c of the fiber optic cable 14a, as will be discussed below. Distinguishing to the test signal is easily done because of wide difference in the power levels required, and because of the differences in absorption by the photoluminescent material layer 20 at the first and second wavelengths. For example, commercial diode lasers with low (milli-watt) power ratings are available in wavelengths of 640 nm, 670 nm, or 720 nm.

Figure 9:
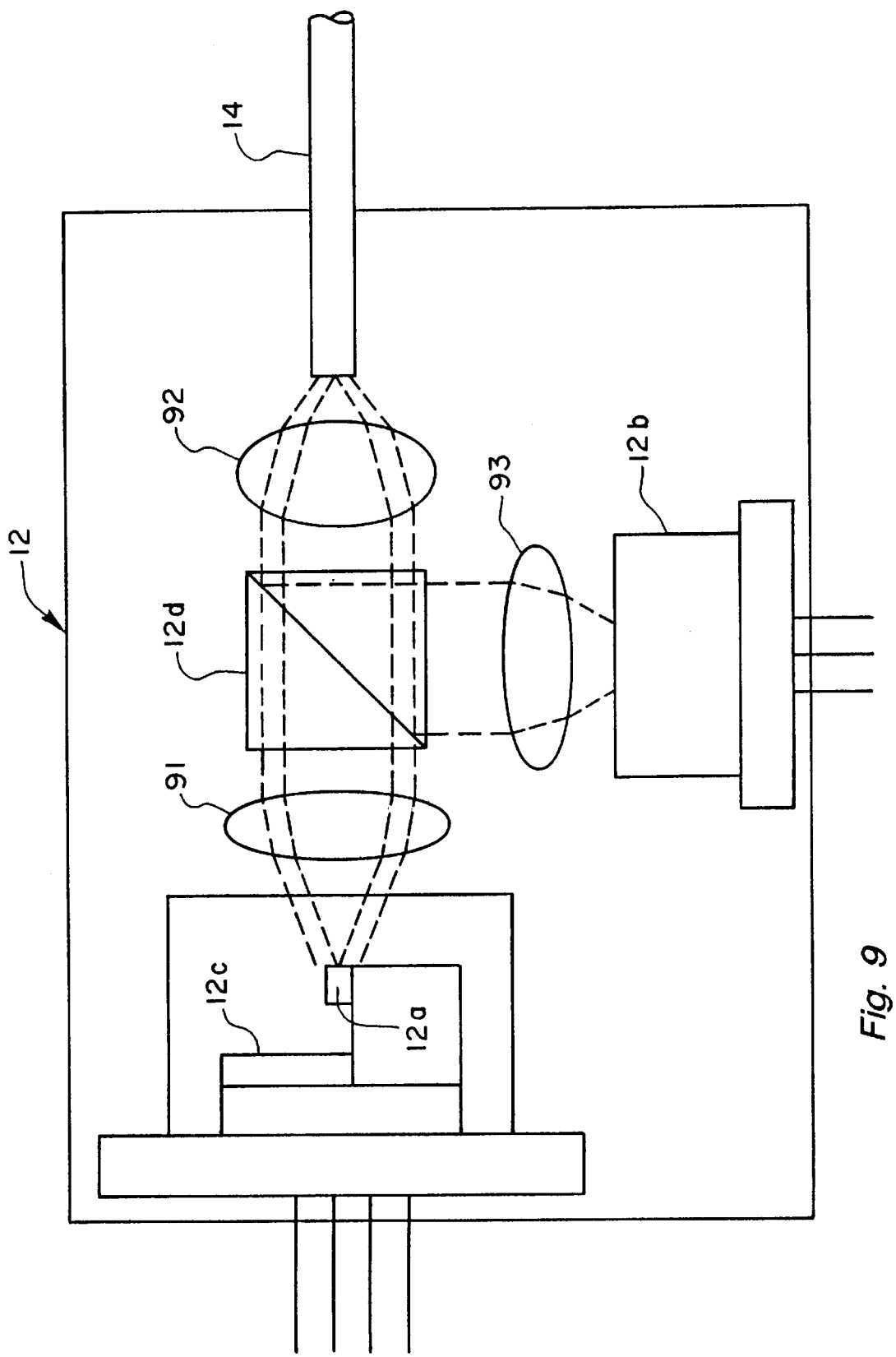
FIG. 9 is a cross-sectional view of the optical firing unit, beamsplitter, and detector assembly.

The primary laser 12a, secondary laser 12b, and detector 12c are coupled with the fiber optic cable assembly 14 through well known interconnection mechanisms 12d, such as a wavelength division multiplexor or a star splitter/coupler. Another method to interconnect the lasers 12a and 12b, and detector 12c to the fiber-optic assembly 14 is the use of a standard beamsplitter and mirror structure, as taught in above referenced U.S. Pat. No. 5,270,537 (this patent is hereby incorporated herein in its entirety by reference). Alternatively, a polarized beamsplitter or dichroic splitter/coupler can be used to interconnect the lasers 12a and 12b, detector 12c. Depending on the intended application of the PBIT structure 10, the primary laser 12a, secondary laser 12b, and detector 12c may be discrete devices, or these devices may be monolithically integrated on a single chip (or assembled as a small module as shown in FIG. 9, for example) and coupled to the fiber optic assembly 14 by a standard tapered fiber technique. The fiber-optic assembly 14 has fiber-optic cables 14a of well known type and design, and connectors 14b, also of well known type and design that connect discrete lengths of fiber optic cables 14a.

In accordance with the present invention, a photoluminescent material layer 20 is disposed at a junction 17, between an end 14c of the fiber optic cable 14a and the ordnance (or energetic material) 18 within optically-initiated device 16. The photoluminescent material 20 may be disposed anywhere within the junction 17 (e.g., on the fiber-end face 14c, on either face of, or within a lens 36, or on a face of, or within the energetic material 18). By optically-initiated device 16 we mean any optically activated device that responds to optical stimulus, (e.g., energy). Examples of optically-activated devices 16 include: optical sensors; optical communication system receivers; optically-initiated ordnance systems; fiber amplifier systems; and the like. The presently preferred optically-initiated device 16 is an ordnance system, which may be any one of a variety of devices, such as detonators, initiators, pyrotechnics, and the like.

The optically-initiated device 16 includes a housing 22 having a charge cavity 24 containing energetic material 18, and an optical fiber sealing means 26 adapted to secure the optical fiber 14a entering housing 22. The fiber optic cable 14a includes a protective sheath 30, cladding material 32, and a core material 34. To test the integrity of the optical fiber assembly 14, the test laser 12b emits a beam of light into the optical fiber assembly 14. The light travels through the optical fiber core 34, with some of the light being reflected by the connectors 14b in the optical fiber assembly, but the vast majority of test laser light continues through the fiber core 34 and enters the optical initiation device 16. The light enters the housing 22 and impinges on the photoluminescent material 20. The photoluminescent material 20 may be any of a broad class of materials that absorb at the test laser wavelength, e.g., 670 nm, and photoluminesces upon exposure to the light of test laser 12b (or soon thereafter). This photoluminescence occurs at different wavelength than that emitted by either primary laser 12a or test laser 12b. Depending on the intended application of PBIT system 10, it may be preferred that the photoluminescent material 20 be substantially transparent at the primary laser wavelength, e.g., 850 nm. Transmittance is enhanced by including an anti-reflective coating on the surface of the PBIT material. Additionally, the light created by photoluminescent material 20 upon exposure to the light emitted by test laser 12b should also not be of sufficient energy to heat the energetic material 18 to its auto-ignition temperature.

Optionally, a lens 36, of well known type, may be placed in the junction 17 between the fiber 14a and the photoluminescent material 20 to focus the light exiting the fiber end 14c (i.e., decrease the spot size and to increase the power density of the light). This focused light augments both the initiation of the energetic material 18 and the photoluminescence of the photoluminescent material 20. A dichroic material layer 38 may optionally be placed between photoluminescent material 20 and the energetic material 18. The dichroic material 38 is substantially transparent at the wavelength of light produced by primary laser 12a and substantially reflective both to the wavelength of light produced by test laser 12b and the light produced by the photoluminescent material 20. The dichroic material 38 helps to concentrate the amount of test laser light to which the photoluminescent material 20 is exposed and therefore increases the amount of photoluminescent light produced. This dichroic material 38 can be integrated into the PBIT material. Also, when the photoluminescent material 20 photoluminesces, the dichroic material 38 increases the amount of light coupled back into the fiber optic cable 14a through end 14c, and therefore increases the amount of photoluminescent light reaching the detector 12c.

For example, the photoluminescent material 20 can include any of a number of dye materials contained within a polymer carrier. Eastman Kodak Company of Rochester, N.Y., publishes a catalog of optical products that shows the specific absorption and photoluminescence spectra for a plurality of laser dyes. Although not limited by any specific list of laser dyes, some examples of useful dye materials include: nile blue A perchlorate (NB); 3–3', diethylthiatricarbocyanine perchlorate (DTTC perchlorate); 3–3'-diethylthiadicarboycyanine iodide (DTDC iodide); and 3–3'-diethylthiatricarbocyanine iodide (DTTC iodide). Each of these must be incorporated into a polymer matrix, with the only limitation on the polymer matrix being that, when cured, the polymer should not have substantial absorption in the wavelengths emitted by the primary laser 12a, the test laser 12b, or the photoluminescence of the photoluminescent material 20. When a dye is incorporated into a polymer, the wavelength at which it absorbs tends to shift slightly. Although this does not detract from the operability of the present invention, it must nevertheless be taken into account when assembling PBIT system 10. Examples of suitable polymer carriers include: polyvinyl butyral (PVB); epoxies such as "EP30-1," made by Master Bond Epoxy, Hackensack, N.J. and "Epo-Tek 310" made by Epoxy Technology, Inc., Billerica, Mass.; Norland Optical Adhesive 61, made by Norland Products, Inc., Newbrunswick, N.J.; and Lens Bond Optical Cement Type SK-9, made by Summers Optical, of Fort Washington, Pa. The laser dyes are added to the polymer until a saturated solution is obtained. The polymer is then spread into a thin film and cured.

Figure 2:
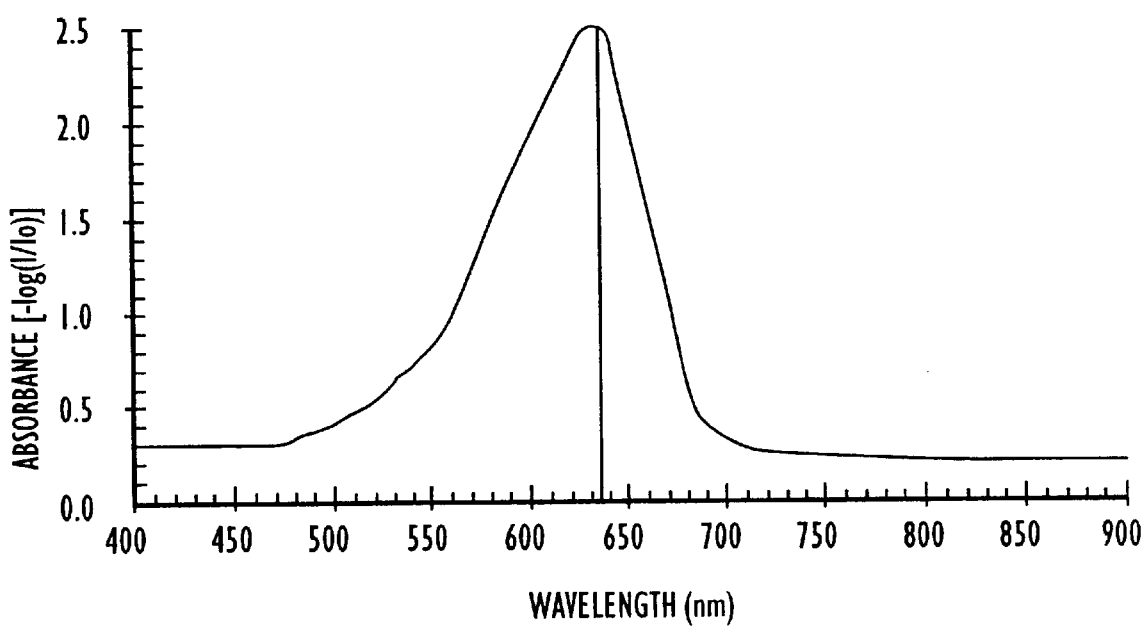
FIG. 2 is a graph showing the absorption characteristics of nile blue A perchlorate in polyvinyl butyral.
Figure 3:
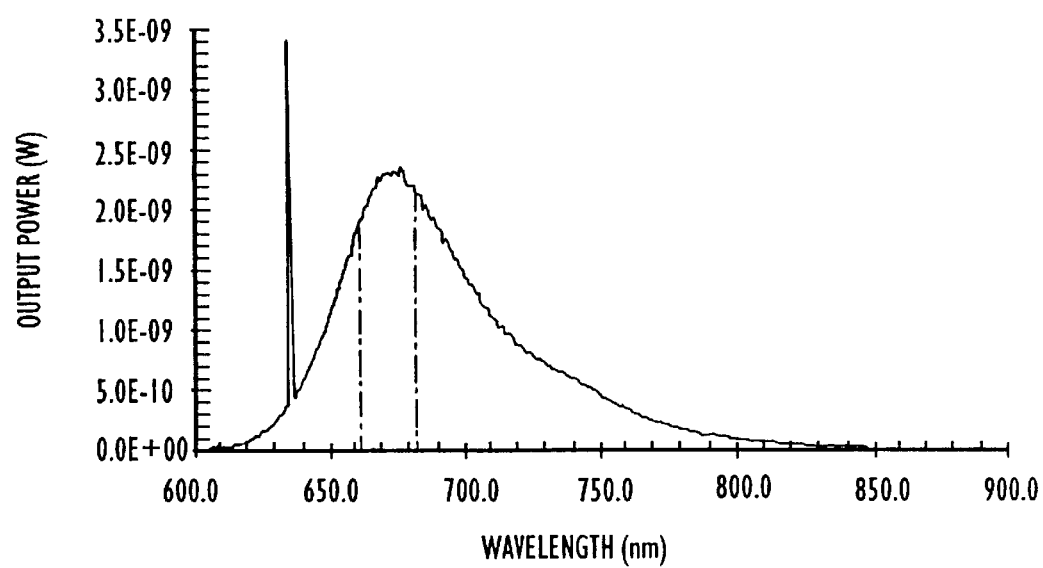
FIG. 3 is a graph showing the photoluminescence intensity of the nile blue A perchlorate in polyvinyl butyral.

One preferred photoluminescent material 20 comprises a NB laser dye contained within a PVB polymer carrier at a concentration of $7 \times 10^{15}$ molecules per squared centimeter. Incorporation of NB in PVB does not substantially shift the absorbency of NB. FIG. 2 shows the absorbency characteristics of an NB/PVB film over a range of wavelengths. As shown, the absorbency is maximized at approximately 640 nm (the test laser wavelength) and a minimum absorbency at approximately 850 nm (the primary laser wavelength). FIG. 3 shows the output power the photoluminescence light produced by this same NB/PVB film. As shown, the photoluminescence peak is maximized at approximately 672 nm which is different than the wavelength emitted by either the primary laser 12a or the test laser 12b, and is of sufficient power to travel through the fiber optic cable assembly to the detector 12c. It should be understood that there are a wide range of capable laser dye materials for the application of the present invention and that all such materials are within the scope of the present invention.

Polymer carriers for laser dye materials have limited usefulness in space applications due to outgassing of the solvents within the polymer solution prior to curing, and other well known problems with polymer operation at very low pressures and temperatures. Therefore, for space or other applications, a presently preferred photoluminescent material 20 utilizes semiconductor structures. For example, direct band gap semiconductors have photoluminescent properties, and the photoluminescence peak will shift depending on the width of the band gap. Although the photoluminescence peak can shift over a broad range, to achieve a photoluminescence peak of approximately 747 nm, the band gap of the semiconductor should be approximately 1.6 eV. At present, the preferred semiconductor structure is a quantum well structure. With a quantum well structure the photoluminescence peak can be tailored with a high degree of precision and the intensity of the photoluminescence light is typically higher than that obtainable with laser dyes. A detailed discussion of quantum well technology can be found in C. Weisbuch, "Quantum Semiconductor Structures" (Academic Press, Inc., 1990). Quantum well photoluminescent materials can be made using many different kinds of semiconductors, which will be known to those skilled in the art. The choice of materials and layer structure is determined by the wavelength region to be absorbed and the wavelength of photoluminescence to be emitted. It should be understood that all such semiconductor systems and all such structures are within the scope of the present invention.

Figure 4:
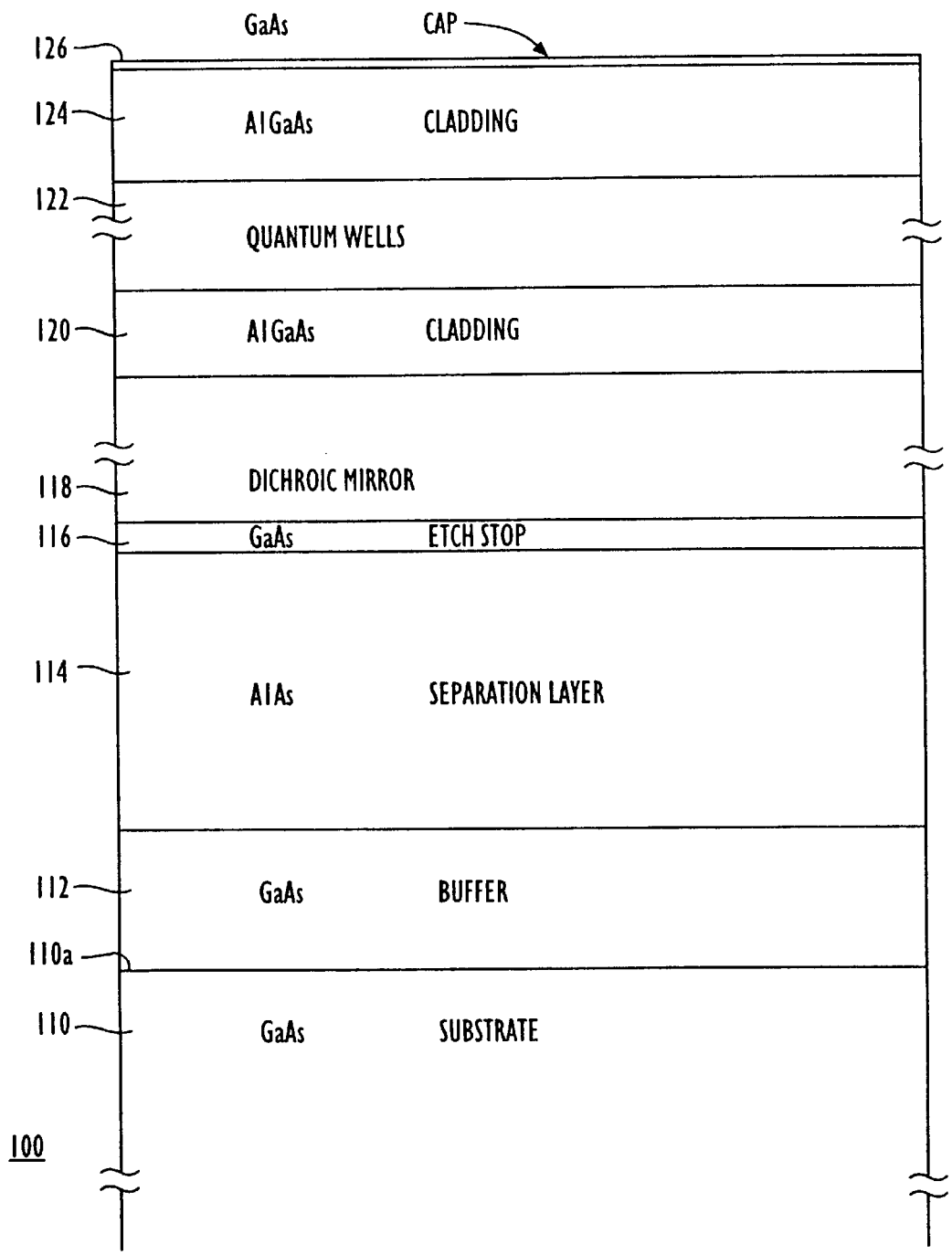
FIG. 4 is a cross-sectional view of a sample quantum well photoluminescence structure of the present invention.

FIG. 4 shows a sample structure of a quantum-well-photoluminescent material (QWPM) 100 according to the present invention. QWPM 100 is prepared, or grown, in the following manner. Growth starts with a commercially produced substrate 110 having a mechanically and chemically polished surface 110a. Then, a 0.5 micron thick buffer layer of gallium arsenide (GaAs) 112 is grown to cover any damage to the crystal lattice structure caused by the polishing process. Next, a 1 micron thick separation layer 114 of aluminum gallium arsenide (AlGaAs) is disposed thereon. This separation layer has an aluminum content on the order of 95–100 percent. The separation layer 114 is used to facilitate layer removal of the substrate 110 and buffer layer 112 from the structure 100. The next layer grown is a 0.12 micron thick GaAs etch stop layer 116 which is insensitive to the chemical etchants used to remove the separation layer 114. If desired, an optional dichroic material 38, as described in detail above, can be integrated into the QWPM 100 as layer 118. The dichroic layer 118 includes a plurality of alternating and juxtaposed layers of GaAs and AlGaAs built up to a desired thickness. Each layer of GaAs and AlGaAs is approximately 52 nm and although the thickness may vary, depending on the wavelength of light to be reflected and the amount of reflectivity needed, a typical thickness of layer 118 is approximately 1 micron. Two 0.25 micron layers of AlGaAs cladding (120 and 124) are disposed on either side of quantum well structure 122, and are chosen to be optically transparent to the light emitted by the primary laser 12a, the test laser 12b, and the photoluminescent peak emitted by the quantum well region. The purpose of cladding layers 120 and 124 is to block the escape of carriers (electrons and holes) generated by absorption in quantum well region 122, and such confinement helps maximize the emitted photoluminescence intensity.

The quantum well structure 122 consist of a series of alternating and juxtaposed layers of AlGaAs barrier layers and GaAs wells. The thickness of each barrier layer is approximately 5 nm and the thickness of each well is approximately 10 nm. The carriers generated by optical absorption fall into the wells and then recombine (from well-defined quantized energy levels) to emit photoluminescent light. By choosing the thickness and composition of the barriers and wells, both the optical absorption wavelength region and optical emission (photoluminescence) can be tailored. On top of the QWPM 100 is a thin GaAs cap 126 to protect the top AlGaAs cladding layer 124 from moisture.

The wavelength of the photoluminescent light produced by the quantum well structure may shift with changes in temperature. This effect can be substantially reduced by creating a series of quantum wells having slightly different photoluminescent wavelengths that are staggered over a predetermined range. In this configuration, at least one of the quantum well structures will photoluminesce at the wavelength monitored by the detector 12c over the entire temperature range.

Figure 5:
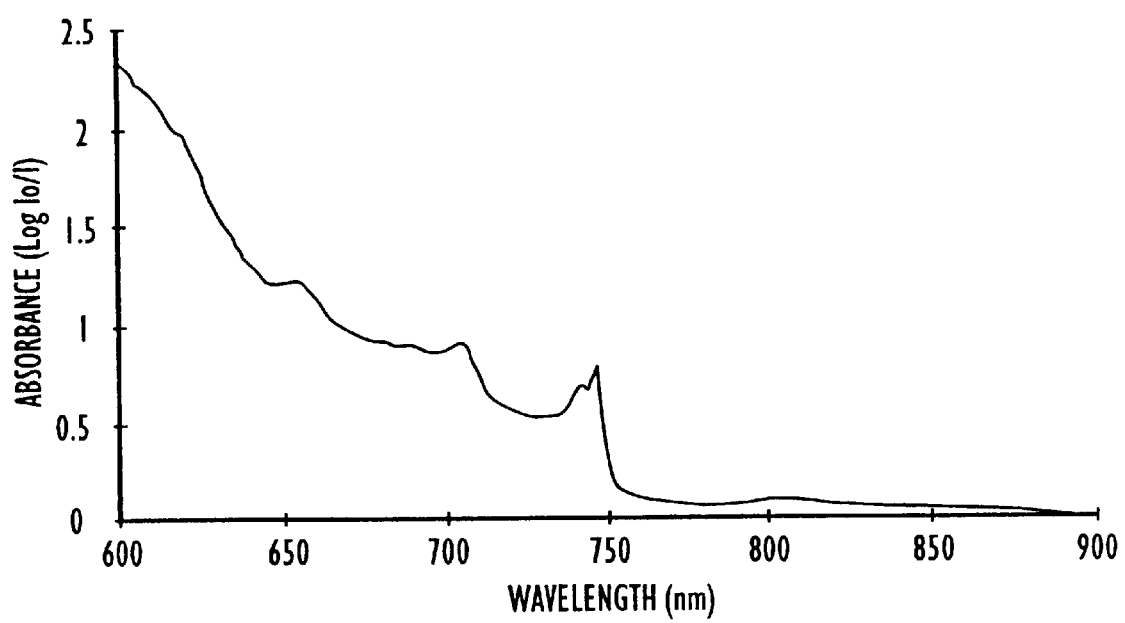
FIG. 5 is a graph showing the absorption characteristics of a quantum well structure.
Figure 6:
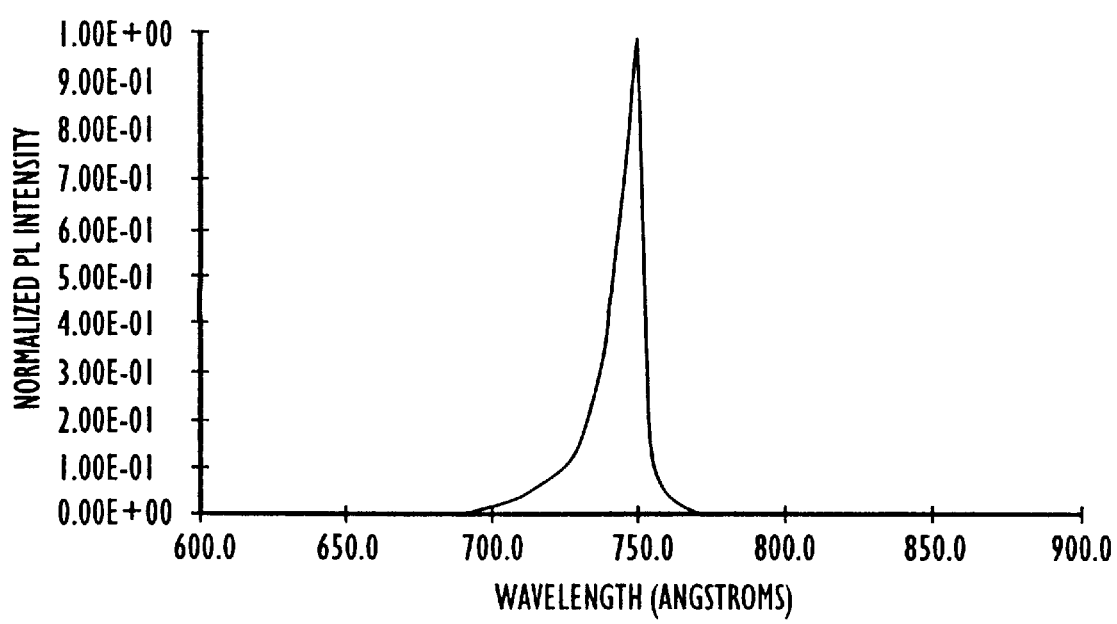
FIG. 6 is a graph showing the photoluminescence intensity of a quantum well structure.

FIG. 5 shows the absorbency characteristics of a quantum well structure (100 in FIG. 4) for various wavelengths of light. As shown, the material transmits light at the wavelength produced by primary laser 12a (e.g., 850 nm) and absorbs at the wavelength produced by test laser 12b (e.g., 640 nm). FIG. 6 shows the output photoluminescence power produced by the same quantum well structure. The maximum power output occurs at approximately 747 nm which is different than the wavelength emitted by either the primary laser 12a or test laser 12b, and is sufficient to travel through fiber optic cable assembly to the detector 12c. It should be understood that those skilled in the art can vary the quantum well structure to tailor the absorbency and transmittance for a particular application, and that all such structures are within the scope of the present invention.

Referring again to FIG. 1, the photoluminescent material 20 photoluminesces when exposed to test laser 12b. As the photoluminesced light travels back through the fiber optic assembly 14, it is coupled to the detector 12c which is configured to measure only that wavelength of light. As stated above, the photoluminescent light has a different wavelength than the light emitted by either primary laser 12a or test laser 12b. Thus, if the detector 12c is configured to only measure the known wavelength of light produced by the photoluminescence of material 20, the detector 12c will not measure any of the reflections of light from the primary laser 12a and the test laser 12b caused by interconnections 14b in fiber-optic assembly 14. This is accomplished by positioning a filter assembly, of well known type, within the detector 12c such that only the photoluminescence wavelength passes through to be detected. This capability simplifies the overall PBIT system 10 in that no high speed electronics are needed to calculate the time of these reflections, nor does the detector 12c need to distinguish between reflections of the same wavelength but having slightly different intensities. The detector 12c need only look for the wavelength produced by the photoluminescent material 20, and if detected, continuity of the fiber-optic cable assembly 14 is confirmed. If a break is present within the assembly 14, a substantial portion of the light from test laser 12b will be reflected and the small amount of light impinging on the photoluminescent material 20 will cause a photoluminescent peak of very low intensity. This peak intensity will travel back through the fiber optic assembly, will be reflected by the break, and the amount reaching the detector will be of sufficiently low intensity, i.e., below some predetermined threshold, so as to indicate a break.

Although it is presently preferred that the primary laser 12a and test laser 12b have distinct wavelength ranges, such that the photoluminescent material 20 absorbs test wavelength and does not absorb primary wavelengths, it should be understood that the primary laser 12a and test laser 12b may emit the same wavelength of light. In such an embodiment, primary laser 12a and test laser 12b can be combined into one laser 12a with two power settings (high and low). The wavelength of light emitted by laser 12a corresponds to the absorption peak of photoluminescent material 20. Thus, at low power settings, the light emitted by laser 12a is absorbed by the photoluminescent material 20, which will photoluminescence and the photoluminescent light will travel back through the fiber optic assembly and will be detected. As long as this low power setting does not have sufficient energy to combust the energetic material 18, there is no danger of ignition during a test pulse. Since the high power setting will also be absorbed by photoluminescent material 20, there must be sufficient power to pass enough energy through the photoluminescent material 20 to combust the energetic material 18. This can be accomplished either by having the energy not absorbed by the photoluminescent material 20 of sufficient power to initiate combustion of the energetic material 18, or by having enough power to essentially vaporize the photoluminescent material 20 and then pass energy through to combust the energetic material 18. Additionally, this could be accomplished by photobleaching of the photoluminescent material, because some photoluminescent materials become substantially transparent after being exposed light above a certain power level.

While the photoluminescent material 20 is described in detail herein as it relates to an optically initiated device, it should be understood that the photoluminescence built-in-test structure of the present invention can be used with other optical systems where a known return signal is desired from a certain location. As stated above, the optically initiated devices of the present invention can be any optically activated device which responds to optical stimulus.

In accordance with yet another aspect of the present invention, a variety of different photoluminescent materials 20, each of which photoluminescence at a distinct and particularly different wavelength, can be designated to, and paired with, a distinct type of ordnance device. As stated above, a typical optically-initiated ordnance system may have a multitude of distinct ordnance devices for various users. For example, one ordnance device may be used for rocket ignition, another for staging, and another for flight termination. Each of these ordnances may be paired with a different particular photoluminescent material (i.e., having a different particular photoluminescent peak) to distinguish each ordnance device during fiber-continuity tests. Such a system could be used to ensure that each and every use (e.g., staging and ignition) is connected to the proper ordnance.

Figure 7:
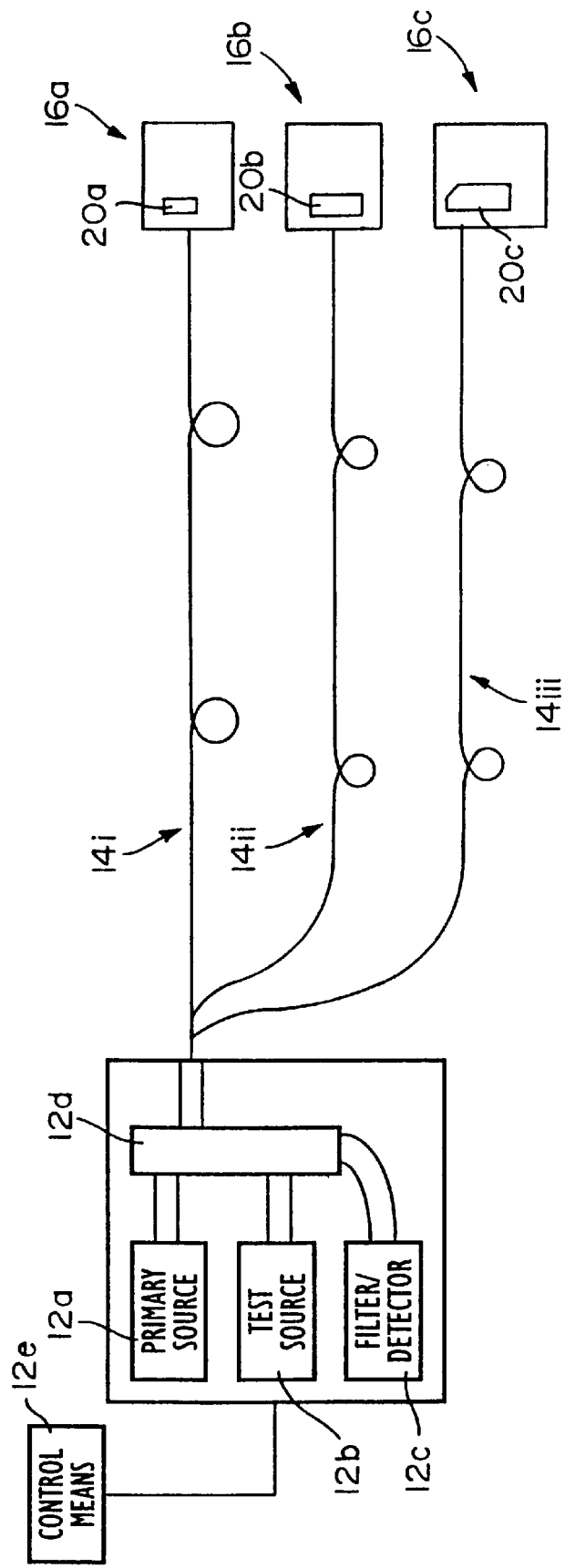
FIG. 7 is a simplified block drawing of a plurality of photoluminescence built-in-test structures.
Figure 7A:
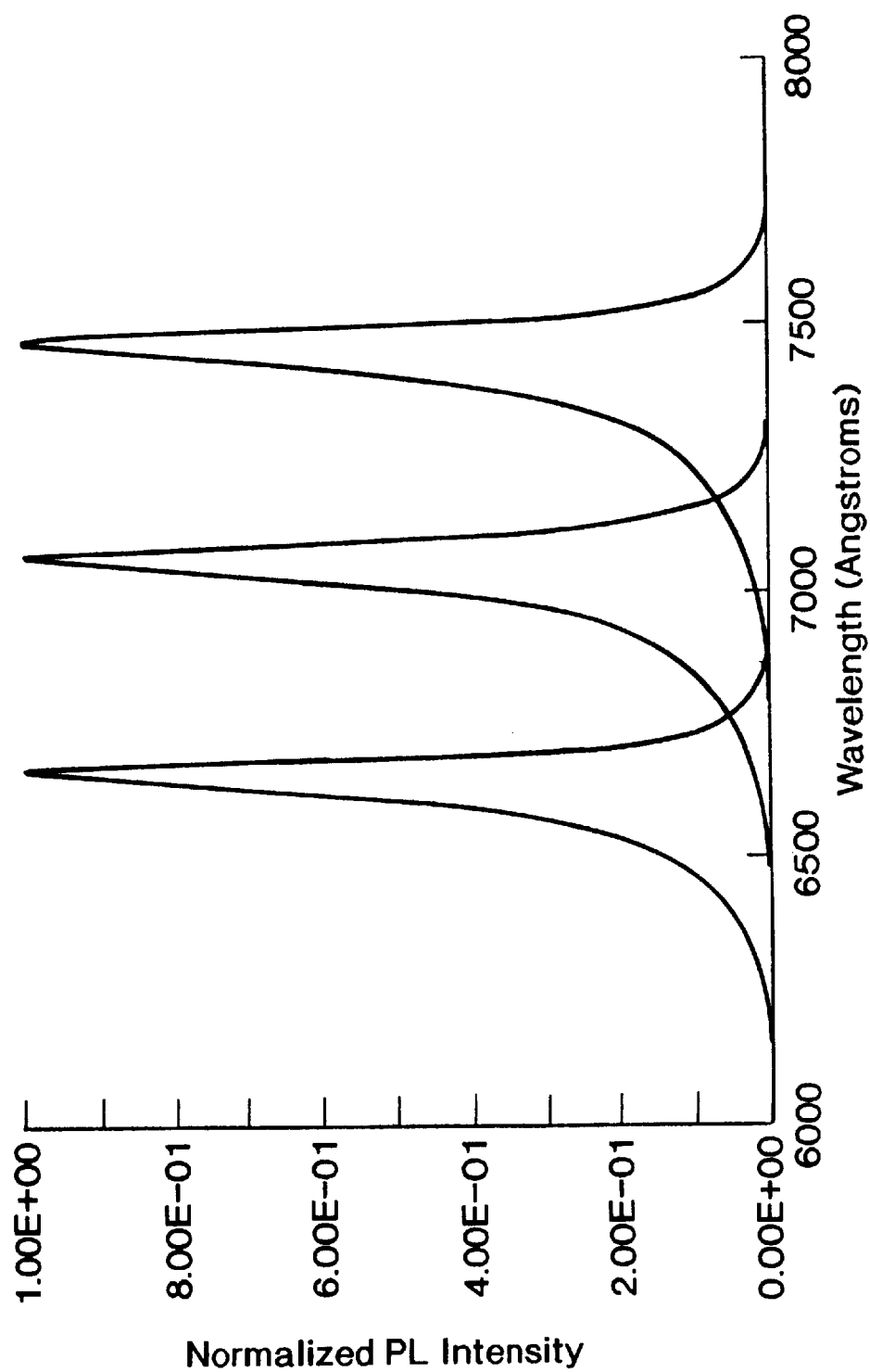
FIG. 7(a) is a graph showing the photoluminescence intensities of three quantum well structures corresponding to the FIG. 7.

Referring now to FIG. 7, an optical firing unit 12 has a primary optical source (laser) 12a, a test optical source (laser) 12b, coupling means 12d and a detector 12c capable of filtering out and measuring a variety of wavelengths of light. Optical firing unit 12 is connected to a plurality of optically-initiated devices, e.g., 16a, 16b and 16c, by a respective fiber optic cable assembly (14i, 14ii, and 14iii). Each of the optically-initiated devices has a respective photoluminescent material (20a, 20b, 20c) that photoluminesces at a different distinct wavelength, as illustrated in FIG. 7(a). In operation, a common test laser 12b would fire, directing a first wavelength of light down all fiber optic cables (14i, 14ii, and 14iii) to all of the optically-initiated devices (16a, 16b and 16c). The detector 12c would be set by controlling electronics 12e to measure only the known wavelength of, for example, the first photoluminescent material 20a. Since absorption in the photoluminescent material is broad band, and the photoluminescent light is narrow band, a single test laser 12b, can be used which has a wavelength within the broadband absorption of all of photoluminescent materials (20a, 20b and 20c), and each photoluminescent light wavelength, being of narrow band, will be separate and distinct (for optically-initiated device identification), as shown in FIG. 7(a). Once the detector 12c confirms the continuity of the fiber-optic cable 14i, the test laser 12b would fire again, but the controlling electronics 12e would reset the detector 12c to measure only the different, second wavelength emitted from the second photoluminescent material 20b. If the photoluminescent peak of the second photoluminescent material 20b is not detected, the controlling electronics 12e could drive detector 12c to scan the wavelength ranges for photoluminescent materials 20a and 20c to determine if the wrong optically initiated device was installed. This process would be repeated until the continuity of all fiber optic cable assemblies were confirmed and, additionally, it is confirmed that the proper optically-initiated device is placed in the correct location of the overall system.

Initiation Monitor

In aerospace applications, redundant optical initiation systems are commonly use to improve reliability. These optical initiation systems are triggered in parallel to help ensure that ordnance events occur when desired. At present, there is no way to determine whether each of the optical initiation systems functioned properly. Monitoring the end result of the ordnance event only indicates whether at least one of the redundant optical initiation systems worked, but not whether they all worked. For example, with two parallel optical initiation systems, there is no way to tell whether the systems have had up to a 50% failure rate.

Figure 8:
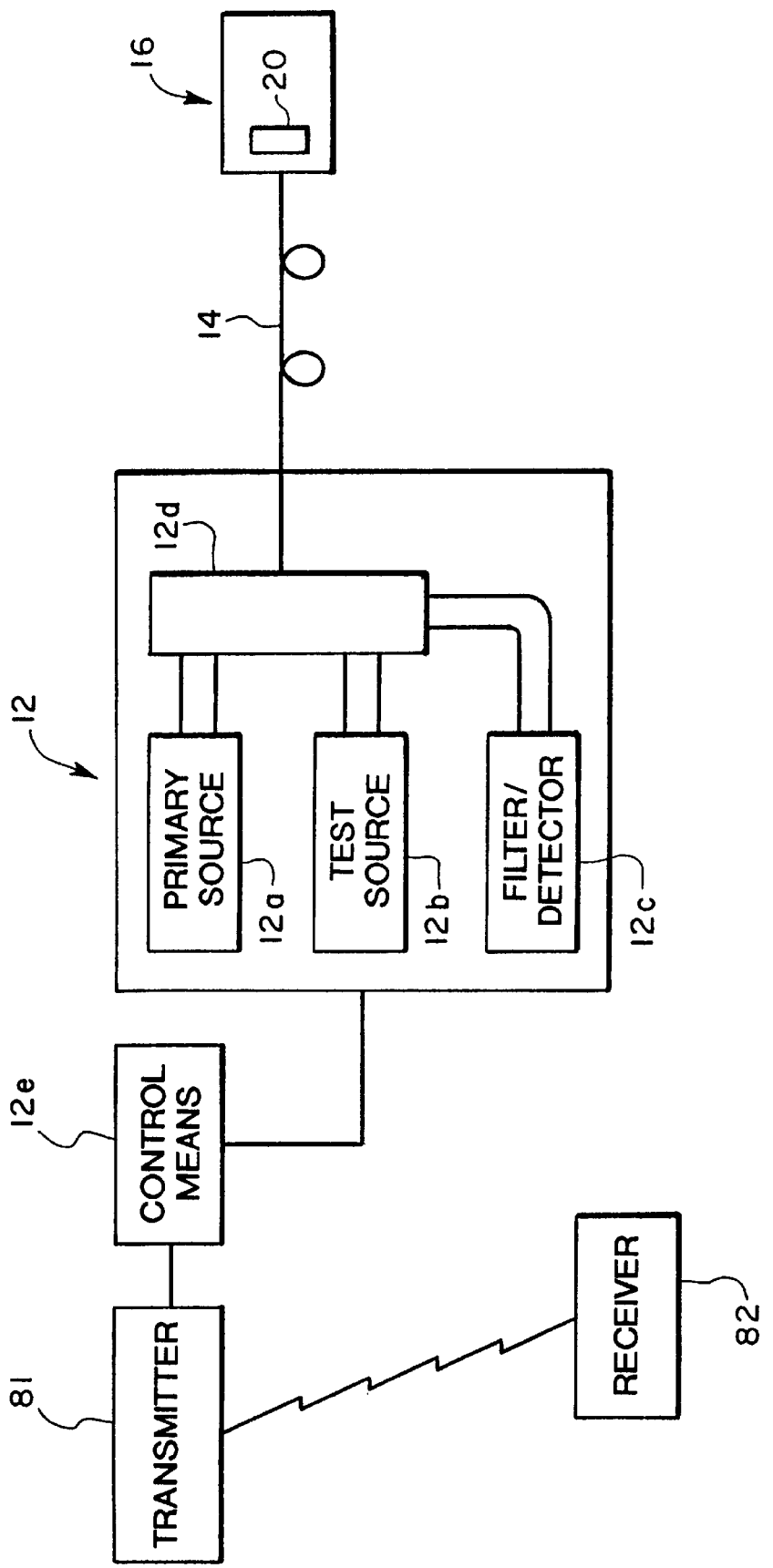
FIG. 8 is a simplified block diagram of another embodiment of the present invention in which the detector is used to detect the initial flash of light resulting from ignition of the ordnance.

FIG. 8 shows another embodiment in which the detector 12c is also used to detect light resulting from combustion of the energetic material 18 in the ordnance that is transmitted back through the fiber optic cable 14. This permits the detector 12c to provide immediate confirmation that the primary laser 12a has successfully ignited the ordnance. Ignition is typically accompanied by a flash of light from the ordnance. A portion of this initial flash is captured by the fiber optic cable and travels back to the detector 12c. The flash is usually white light, or at least sufficiently broad-spectrum, so that a significant portion of the light from the flash is detected by the detector 12c. The controlling electronics 12e can be programmed to monitor the output of the detector 12c during a predetermined time period after the primary laser 12a has been fired to determine success or failure of the optical initiation system. As shown in FIG. 8, this information can be transmitted by a transmitter 81 associated with the control electronics 12e to a remote receiver 82 by telemetry or wire, even in a destruct scenario provided the control electronics and transmitter hardware are fast enough.

FIG. 9 provides further details of the preferred embodiment of the optical firing unit 12, including the primary laser 12a, test laser 12b, detector 12c, and beamsplitter 12d. The primary laser 12a and the detector 12c can be housed in a single assembly as shown in FIG. 9. The beamsplitter 12d directs light from either the primary laser 12a or test laser 12b into the proximal end of the optical fiber 14. Any light returning through the optical fiber 14 (i.e., luminescent light, or light resulting from combustion of the ordnance) is directed into the beamsplitter 12d and a substantial portion of this light falls onto the detector 12c, as previously discussed. A series of lenses 91, 92, and 93 focus the light emitted by the light sources 12a and 12b into the end of the optical fiber 13.

Built-In-Test Interlock.

Lasers are classified as either class I (safe), II, III, or IV, based on their eye and skin hazard. LIO systems typically use class III or IV lasers that require a myriad of laser safety precautions, and may include expensive facility modifications. Lasers may be declassified to class I if the light is completely contained, therefore requiring no safety precautions. The BIT system described above can be used as an interlock mechanism for the primary laser 12a to permit declassification of the LIO system to class I. The BIT system is capable of detecting whether ordnance, a simulator, or other device is properly attached to the distal end of the fiber optic cable, thus containing the laser light. If the system does not pass the BIT, the controlling electronics 12e can be programmed to not allow the primary laser 12a to fire. If used in an aerospace application, the interlock can be disabled before flight to eliminate concerns about introducing a possible means for causing the ordnance to fail to fire.

Thermal Insulation.

The LIO system must locally heat the ordnance material to the point of auto-ignition. The dominant thermal conduction path to overcome is back through the optical element introducing the light. A thermal insulator between the fiber optic cable and the ordnance significantly reduces the amount of energy required to cause initiation of the ordnance. In the present invention, the photoluminescent material provides a significant insulating effect that reduces thermal conduction back through the fiber optic cable and thereby accelerates ignition of the ordnance.

Temperature Effects on Semiconductor Luminescence.

The previous discussions describe the semiconductor material applied to the distal end of a fiber optic for built-in-test purposes. The material is used to generate a unique wavelength of luminescence coupled to the fiber once the material has been optically pumped through the same fiber. Such a configuration may also be used as a remote temperature sensor at the distal end of a fiber optic based on semiconductor luminescence intensity and wavelength changes with temperature, each of which are readily discerned with proper detection.

The properties of semiconductor materials are functions of temperature. Some of the properties vary more with temperature than others (i.e. are stronger functions of temperature). The properties that are of interest to this discussion include lattice constant, bandgap, minority carrier lifetime, and free carrier distribution. These particular properties are major factors in determining the behavior of free electrons in the material's conduction band, and holes (the absence of electrons) in its valence band. This behavior, in turn, directly determines the luminescent properties of the material.

Recombination of electrons with holes occurs in semiconductors via radiative and nonradiative processes. Luminescence is the term used to describe the event whereby an electron and hole recombine and emit a photon (radiative process). If the radiative process involves an electron at the bottom of the material's conduction band ($E_c$) directly combining with a hole at the top of the valence band ($E_v$), then a photon of energy equal to the semiconductor's bandgap (Eg=Ec–Ev) is emitted. Measurement of luminescence emitted from a semiconductor usually shows a large peak centered around the wavelength associated with this energy. The width of the peak is due to thermal smearing of the bands and allowed transitions of electrons above and slightly below the conduction band edge to available hole sites below and slightly above the valence band edge.

In general, the bandgap of a semiconductor material will decrease with increasing temperature. The reduced bandgap manifests itself by the shifting of the luminescence peak to longer wavelengths, i.e., lower energy, as temperature increases (see FIGS. 10–12). This is a direct result of thermal expansion. The atoms in the semiconductor's crystal lattice move farther apart with increasing temperature, changing the coupling between adjacent atoms and thus, altering the band structure. The shift is a well-behaved function in common III–V semiconductor compounds of the form:

$$E_g = A - \frac{BT^2}{(T+C)}$$

and can be utilized to determine the temperature of the material. In this equation, T is the temperature in degrees Kelvin of the material and A, B, and C are constants. For example, in bulk GaAs, A=1.519, B=5.405×10$^{-4}$, and C=204. Knowing what material is luminescing and measuring the wavelength of the luminescence peak can result in an indication of the material's temperature.

Figure 10:
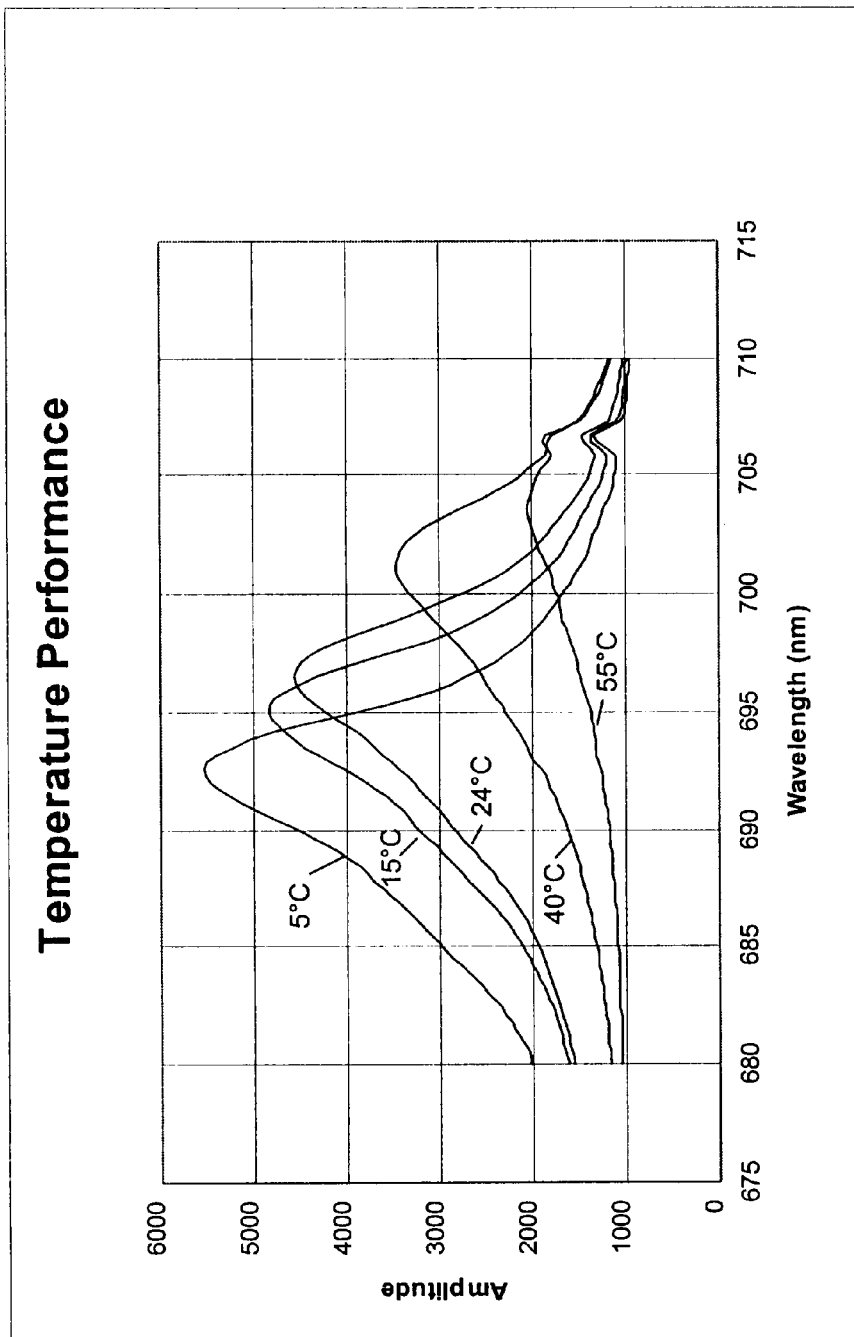
FIG. 10 is a graph illustrating the shift in photoluminescence intensities and wavelengths at various temperatures.
Figure 11:
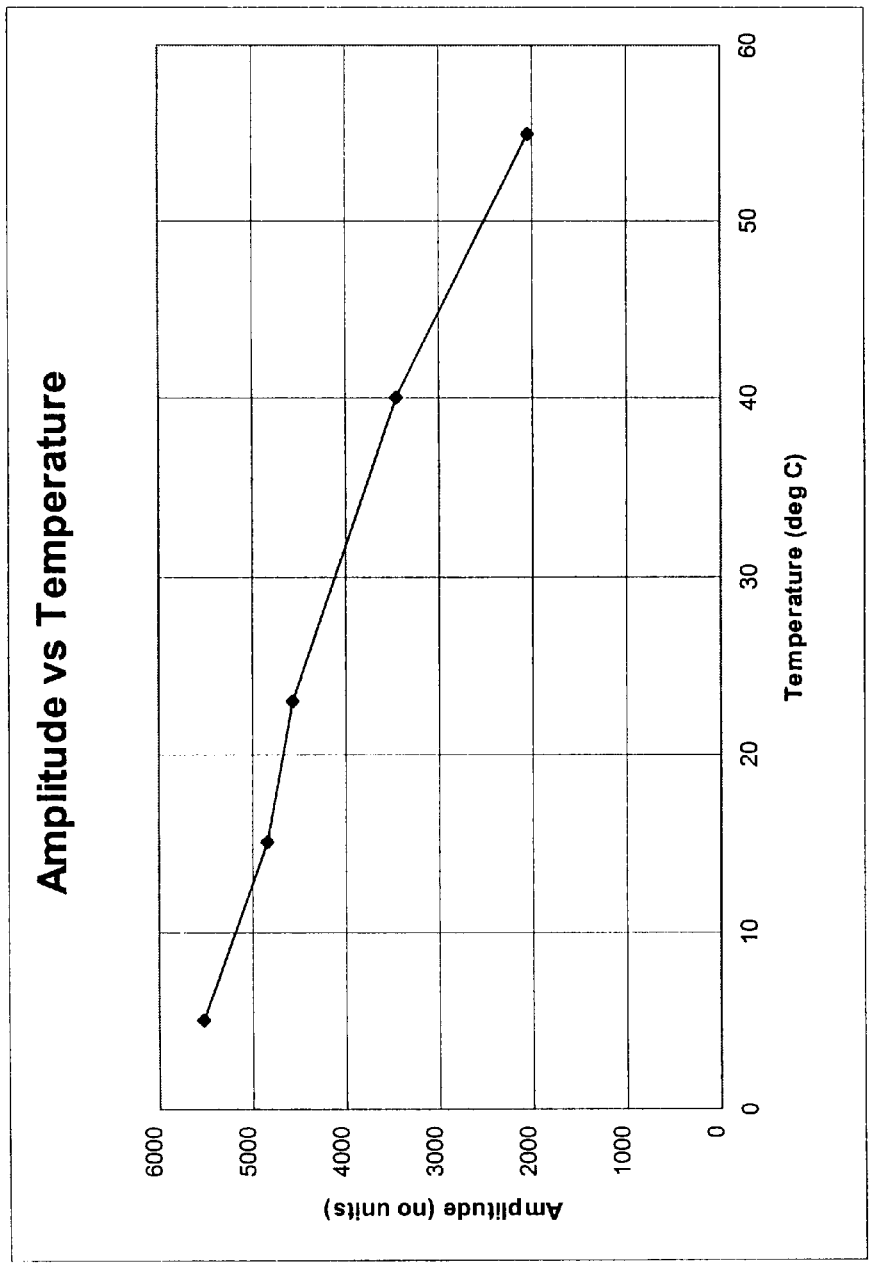
FIG. 11 is a graph corresponding to FIG. 10 showing the peak amplitude of the photoluminescence as a function of temperature.

A side effect of temperature on the luminescence is to alter the peak width and height, as shown in FIGS. 10 and 11. As the temperature increases, the peak height drops and the width broadens. Several temperature dependent properties of the material take part in these phenomena but the primary ones are free carrier distribution and minority carrier lifetime.

Free carriers occupy states within the band structure of the material. The number of free carriers available at any given energy level follows a Fermi-Dirac distribution function:

$$f(E) = \frac{1}{\left(1 + e^{\frac{(E-E_F)}{kT}}\right)}$$

where again, T is temperature, k is the Boltzmann constant, and $E_F$ is the Fermi level in the material. The Fermi level energy is determined by the band structure and the kind (electron and hole) and number of free carriers. An increase in the temperature of the material causes the free carrier distribution to spread over a wider range of energies. This means that the free carriers available to emit luminescence are spread over a wider range of allowed states. Photons are emitted from recombinations occurring over a broader range of energies, thus widening the luminescence peak. In addition, spreading the carriers over a broader range of energies effectively reduces the number available for band edge to band edge recombination, thereby reducing the peak height.

While the peak height may be reduced and the width broadened, generally, within a reasonable temperature range, the total power emitted (i.e., the area under the luminescence peak curve) will stay constant. However, as the temperature continues to increase, another effect begins to manifest itself. For a material to have efficient luminescence, radiative processes must dominate over competing nonradiative processes. Increasing the temperature of the material tends to increase the amount of time a free carrier occupies a given site. This increase in time tends to increase the probability that a free carrier will recombine via a nonradiative path in the material, thus reducing the total luminescence intensity from the material.

The effects mentioned above are basically true whether the material structure is a quantum well design or just pure bulk material. Temperature effects on the luminescent properties of quantum wells alone are, in the case of the present discussion, second and third order effects. The height above the bottom of the well of the first allowed state does not change appreciably with temperature. However, the bottom of the well is set by the band edge which, as discussed above, does change (bulk effect). The spreading of the free carrier distribution effectively acts much the same as with bulk material, spreading carriers into other allowed energy states either in the well or above, widening the luminescent peak.

Figure 12:
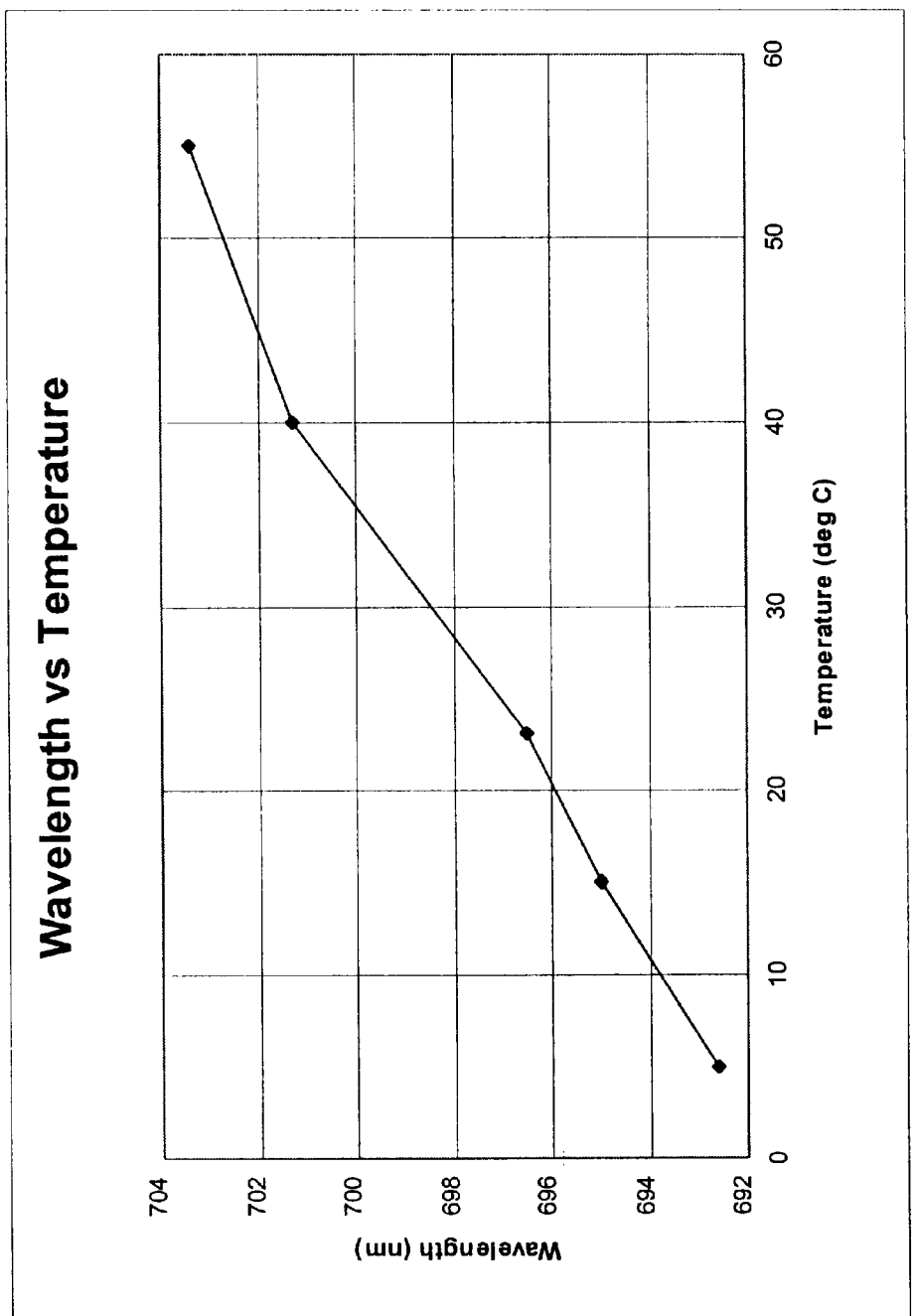
FIG. 12 is a graph corresponding to FIG. 10 showing the peak wavelength of the photoluminescence as a function of temperature.

The wavelength and/or amplitude of the photoluminescent peak can be measured by means of the detector 12c and converted to a temperature measurement using calibration curves as shown in FIGS. 11 or 12. The preceding discussion has addressed the use of semiconductor materials and quantum well structures at the distal end of the optical fiber to produce photolumenescence. However, it should be noted that any of a wide variety of photoluminescent materials could be substituted.

While the invention is described herein in some detail, many modifications and variations will become apparent to those skilled in the art. It is our intent to be limited only by the scope of the appending claims, and not by the specific details or instrumentalities present herein by way of description of the preferred embodiments.

We claim:

1. An apparatus for measuring the temperature at the distal end of an optical fiber, said apparatus comprising:

an optical fiber having a first end and a second end;

a light source for selectively transmitting light energy within a predetermined wavelength range into said first end of said optical fiber;

a photoluminescent material disposed at said second end of optical fiber, said photoluminescent material being photoluminescent when exposed to said light source wavelength range at a wavelength determined as a function of temperature, said photoluminescent light having a wavelength different than said light source wavelength range, said photoluminescent light being coupled into said second end of said optical fiber for passage through said optical fiber to said first end; and a detector coupled to said first end of said optical fiber for responding to said photoluminescent light to indicate temperature at said second end of said optical fiber.

2. The apparatus of claim 1 wherein said detector measures said temperature as a function of the wavelength of said photoluminescent light.

3. The apparatus of claim 1 wherein said detector measures said temperature as a function to the amplitude of said photoluminescent light.

4. The apparatus of claim 1 wherein said photoluminescent material comprises a semiconductor for transmitting light in a first wavelength range and photoluminescing where exposed to a second wavelength range.

5. The apparatus of claim 4 wherein said semiconductor includes a quantum well structure.

6. The apparatus of claim 5 wherein said quantum well structure comprises a gallium-arsenide coating applied to said second end of said optical fiber.

7. The apparatus of claim 5 wherein said quantum well structure incorporates a dichroic mirror for transmitting light in a first wavelength range, and reflecting light in a second wavelength range.

8. An apparatus for testing the integrity of an optical fiber in a test mode and for initiating ordnance coupled to said fiber in an initiation mode, said apparatus comprising:

an optical fiber having a first end and a second end;

a light source for selectively transmitting light energy within a first wavelength range into said first end of said optical fiber in said test mode, and for transmitting light energy within a second wavelength range into said first end of said optical fiber in said initiation mode;

optically-initiated ordnance coupled to said second end of said optical fiber which, when exposed to light in said first wavelength range, is heated to an auto-ignition temperature and then emits initiation light energy that is coupled into said second end of said optical fiber for passage through said optical fiber to said first end;

a photoluminescent material disposed at a junction of said ordnance and said second end of said optical fiber that is substantially transparent to said first wavelength range, said photoluminescent material being photoluminescent when exposed to said second wavelength range at a wavelength determined as a function of temperature, said photoluminescent light having a wavelength different from either said first or said second wavelength range, said photoluminescent light being coupled into said second end of said optical fiber for passage through said optical fiber to said first end; and a detector coupled to said first end of said optical fiber for responding to said photoluminescent light to indicate continuity of said optical fiber in said test mode and to indicate temperature at said second end of said optical fiber.

9. The apparatus of claim 8 wherein said detector measures said temperature as a function of the wavelength of said photoluminescent light.

10. The apparatus of claim 8 wherein said detector measures said temperature as a function to the amplitude of said photoluminescent light.

11. The apparatus of claim 8 further comprising a dichroic mirror disposed on a surface of said photoluminescent material remote from said second end of said optical fiber, wherein said dichroic mirror is transparent to light in said first wavelength range, and is reflective to both light in said second wavelength range and said photoluminescent light.

12. The apparatus of claim 8 wherein said light source comprises:

a primary light source for transmitting light energy within said first wavelength range;

a test light source for transmitting light energy within said second wavelength range; and a beamsplitter for directing said light energy from said primary light source and said test light source into said first end of said optical fiber.

13. The apparatus of claim 8 wherein said photoluminescent material comprises a semiconductor for transmitting light in said first wavelength range and photoluminescing where exposed to said second wavelength range.

14. The apparatus of claim 13 wherein said semiconductor includes a quantum well structure.

15. The apparatus of claim 14 wherein said quantum well structure incorporates a dichroic mirror for transmitting light in said first wavelength range, and reflecting light in said second wavelength range and said photoluminescent light.

16. An apparatus for testing the integrity of an optical fiber in a test mode and for confirming initiation of ordnance coupled to said fiber in an initiation mode, said apparatus comprising:

an optical fiber having a first end and a second end;

a primary light source for transmitting light energy within a first wavelength range in said initiation mode;

a test light source for transmitting light energy within a second wavelength range in said test mode;

means for directing light from said primary light source and said test light source into said first end of said optical fiber;

optically-initiated ordnance coupled to said second end of said optical fiber which, when exposed to light in said first wavelength range, is heated to an auto-ignition temperature and then emits initiation light energy that is coupled into said second end of said optical fiber for passage through said optical fiber to said first end;

a photoluminescent material disposed at a junction of said ordnance and said second end of said optical fiber that is substantially transparent to said first wavelength range and at least a portion of said initiation light, said photoluminescent material being photoluminescent when exposed to said second wavelength range at a wavelength determined as a function of temperature, said photoluminescent light having a wavelength different from either said first or said second wavelength range, said photoluminescent light being coupled into said second end of said optical fiber for passage through said optical fiber to said first end; and a detector coupled to said first end of said optical fiber for responding to said photoluminescent light to indicate continuity of said optical fiber in said test mode and to indicate temperature at said second end of said optical fiber, and for responding to said initiation light to confirm initiation of said ordnance in said initiation mode.

17. The apparatus of claim 16 wherein said detector measures said temperature as a function of the wavelength of said photoluminescent light.

18. The apparatus of claim 16 wherein said detector measures said temperature as a function to the amplitude of said photoluminescent light.

19. The apparatus of claim 16 further comprising a dichroic mirror disposed on a surface of said photoluminescent material remote from said second end of said optical fiber, wherein said dichroic mirror is transparent to both light in said first wavelength range and at least a portion of said initiation light, and is reflective to both light in said second wavelength range and said photoluminescent light.

20. The apparatus of claim 16 wherein said photoluminescent material comprises a semiconductor for transmitting light in said first wavelength range and photoluminescing where exposed to said second wavelength range.

21. The apparatus of claim 20 wherein said semiconductor includes a quantum well structure.

* * * * *